US008176048B2

(12) United States Patent
Morgan

(10) Patent No.: US 8,176,048 B2
(45) Date of Patent: May 8, 2012

(54) METHOD AND SYSTEM FOR MAXIMUM-INFORMATIVENESS INFORMATION EXTRACTION USING A DOMAIN-SPECIFIC ONTOLOGY

(75) Inventor: Alexander P. Morgan, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 259 days.

(21) Appl. No.: 12/615,463

(22) Filed: Nov. 10, 2009

(65) Prior Publication Data

US 2011/0113069 A1 May 12, 2011

(51) Int. Cl.
*G06F 17/30* (2006.01)

(52) U.S. Cl. .................................. 707/736; 707/737

(58) Field of Classification Search .................. None
See application file for complete search history.

(56) References Cited

U.S. PATENT DOCUMENTS

| | | | | |
|---|---|---|---|---|
| 7,769,768 | B2 * | 8/2010 | Holloway et al. | 707/755 |
| 7,783,659 | B2 * | 8/2010 | Akkiraju et al. | 707/766 |
| 2010/0281025 | A1 * | 11/2010 | Tsatsou et al. | 707/733 |

OTHER PUBLICATIONS

Bruninghaus et al.: The Role of Information Extraction for Textual CBR; in Aha et al., Case-Based Reasoning Research and Development: 4th International Conference on Case-Based Reasoning (ICCBR-01), Vancouver, B.C., Canada, Jul. 30-Aug. 2, 2001; Springer Verlag, Lecture Notes in Artificial Intelligence LNAI 2080, p. 74-89 (2001), Heidelberg, Germany.

M. Lenz: Textual CBR and Information Retrieval: A Comparison; in: Proceedings 6th German Workshop on Case-Based Reasoning (1998).
D. Maynard et al., TRUCKS: A Model for Automatic Multi-Word Term Recognition; Journal of Natural Language Processing, 8(1): 101-126; (2000).
Medelyan et al.: Thesaurus Based Automatic Keyphrase Indexing; Proceedings of the 6th ACM/IEEE-CS joint Conference on Digital Libraries; p. 296-297, New York, NY, USA (2006).
D. McGuinness: Ontology-enhanced Search for Primary Care Medical Literature, in Proc. Int. Medical Informatics Association Working Group 6—Medical Concept Representation and Natural Language Conference, Phoenix, AZ, Dec. 16-19, 1999.
E. Voorhees: Using Wordnet to Disambiguate Word Senses for Text Retrieval; in SIGIR 93: Proceedings of the 16th Annual International ACM SIGIR Conference on Research and Development in Information Retrieval; p. 171-180, ACM Press, New York, NY, USA (1993).
W. Woods: Conceptual Indexing: A Better Way to Organize Knowledge; Technical Report, Sun Microsystems, Inc., Mountain View, CA, USA (1997).

* cited by examiner

*Primary Examiner* — Hung Q Pham
(74) *Attorney, Agent, or Firm* — Quinn Law Group, PLLC

(57) ABSTRACT

A method transforms unstructured text into structured data in a domain-specific ontology. The method includes recording an input block of text using an information extraction module (IEM), accessing a domain-specific ontology and supplemental data in a knowledge source(s) via the IEM, processing the input text block, and using the IEM to generate a plurality of nodes in the domain-specific ontology. Each node classifies the unstructured text to corresponding objects of interest, thereby transforming the unstructured text into the structured data. An IEM is also provided having a computer device and an algorithm executable thereby to transform unstructured text into structured data in a domain-specific ontology. The IEM is adapted for recording a text phrase using the computer device, accessing and retrieving the domain-specific ontology and supplemental data from a knowledge source(s), and processing the text block using the computer device to generate a plurality of nodes in the domain-specific ontology.

16 Claims, 3 Drawing Sheets

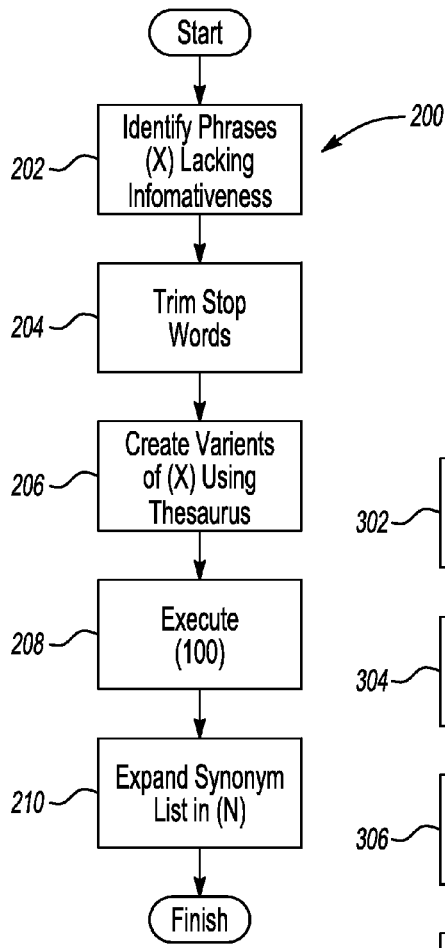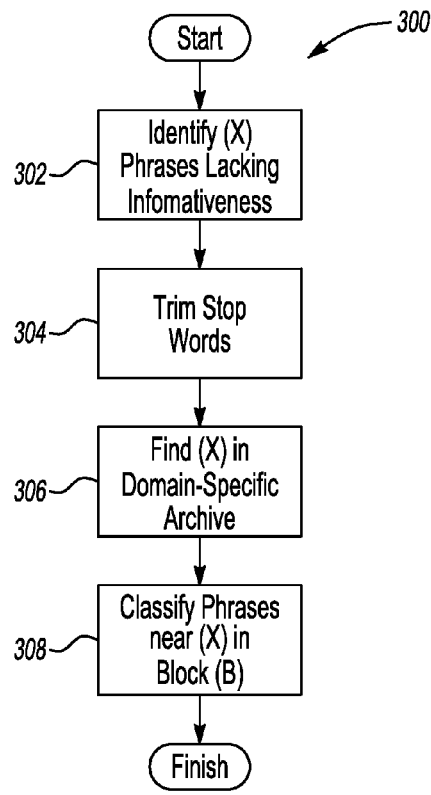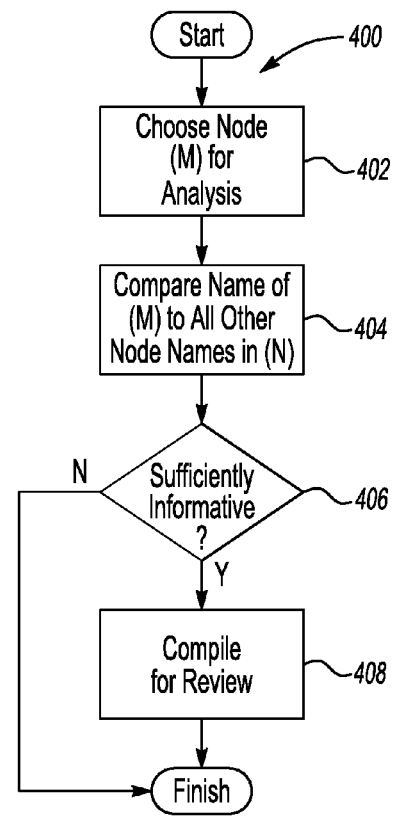
Fig-4
Fig-5
Fig-6

METHOD AND SYSTEM FOR MAXIMUM-INFORMATIVENESS INFORMATION EXTRACTION USING A DOMAIN-SPECIFIC ONTOLOGY

TECHNICAL FIELD

The present invention relates to a method and a system adapted for information search, extraction, and summarization.

BACKGROUND OF THE INVENTION

Information extraction (IE) is an emerging science that refers to adding structure (e.g., indexes or annotations) to unstructured data, especially unstructured text. IE commonly uses various types of natural-language-processing methods such as semantic analysis, term-weighting approaches, term recognition, indexing, etc. Data analysis and data mining are methods for extracting useful knowledge from data. When the data is unstructured, it is extremely difficult to analyze or mine successfully. Therefore, IE is a critical preprocessing step in data analysis or data mining of such data, for example, quality-related text data in a manufacturing environment.

SUMMARY OF THE INVENTION

Accordingly, a method and a system are provided herein for information extraction (IE) of unstructured text using a domain-specific ontology and supplemental data, as explained below. The method of the invention may be embodied as an algorithm and automatically executed by a computer device, which is referred to hereinafter as an information extraction module (IEM).

The IEM uses a predetermined domain-specific ontology to classify objects of interest. For example, the objects of interest might be automotive parts in one embodiment, although any other object of interest may be used without departing from the intended scope of the invention. The ontology includes a plurality of nodes, with each node representing one concept as a cluster of synonyms such as "fuel injector pipe", "fuel injection tube", "fuel injection fuel feed hose", etc., staying with the automotive parts example. A block of text is input into the IEM, and the IEM outputs various nodes of the given ontology. The nodes of the ontology classify the discovered references in the input text by the objects of interest. An informativeness function is defined from the ontology to quantify the significance or the "informativeness" of phrases in the input text block.

The method provides a way to index free-text data by categories that are organized via the taxonomic structure of the ontology. As used herein, and as understood in the art, the term ontology refers to taxonomy of linked concepts, where each link represents a particular logical or linguistic relationship. Indexing converts the free text into feature vectors that can be analyzed using standard statistical and/or available data mining techniques. The method also features an ontology-guided information search. As a result, free-text data, which previously could be searched with relatively low recall and precision, may be used as data input for subsequent analytical processing.

Execution of the algorithm(s) as set forth herein generates structured values from free text, i.e., text that is neither predefined nor selected from a list of fixed text phrases. The algorithm may be characterized by the following features: (1) the IE process is based on a predetermined domain-specific ontology, and (2) an informativeness function is used to disambiguate different matches in the ontology. The informativeness function quantifies how accurately or effectively a discovered phrase has been classified.

That is, given a block of text as an input, e.g., a short phrase or a paragraph or pages, the method selects one or more nodes in the ontology representing concepts or objects referenced in the block of text. The method enabled by the algorithm disclosed herein includes cleaning the block of text, creating a list of phrases in the block of text that may refer to objects of interest and mapping each phrase into the ontology as a means of classifying it. The method does so without using context, i.e., without taking into account the phrases close to the phrase being classified, wherever possible, but uses context if required. A distinct sub-process is defined for "context expansion" by embedding the phrase being classified into a domain-specific text archive, if the context in which the phrase naturally arises is insufficient to classify it. Another distinct sub-process of this invention takes a phrase that does not match any nodes in the ontology and puts it through a synonym-generation process using standard lexical resources, e.g., thesauri. Phrases that remain unclassified are reserved for human analysis.

In particular, a method is provided for transforming unstructured text into structured data via indexing using a domain-specific ontology. The method includes indexing an input text phrase using an information extraction module (IEM), embedding the phrases in a supplemental domain-specific text archive, if context expansion is required, generating synonyms of the phrase using supplemental lexical resources, and processing the input text phrase using the IEM to thereby generate a plurality of nodes in the domain-specific ontology. Each phrase in the input unstructured text is thus indexed by the set of predetermined corresponding objects of interest found in the ontology. Therefore, the unstructured text is transformed into structured data.

An IEM is also provided having a computer device and an algorithm executable by the computer device to transform unstructured text into structured data via a domain-specific ontology. The IEM is adapted for recording a text phrase using the computer device, accessing and retrieving data from at least one knowledge source, and processing the text phrase using the computer device to thereby generate a plurality of nodes in the domain-specific ontology.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is a flow chart describing an algorithm for automatically expanding a list of synonyms in the system of FIG. 1 using a general thesaurus;

FIG. 5 is a flow chart describing an algorithm providing automatic context expansion in the system of FIG. 1; and FIG. 6 is a flow chart describing an algorithm for comparing node names in the system of FIG. 1 to determine implied inconsistencies.

DESCRIPTION OF THE PREFERRED EMBODIMENTS

Figure 1:
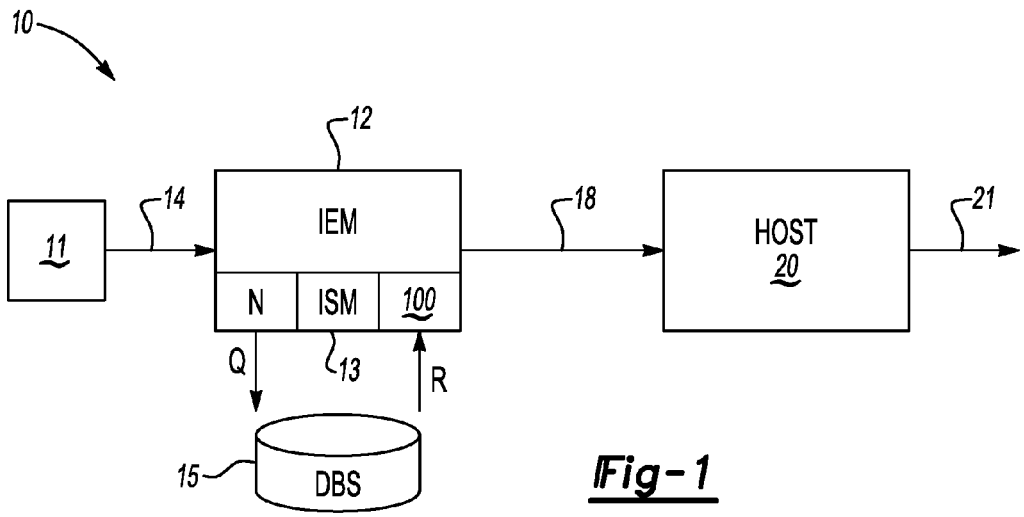
FIG. 1 is a schematic illustration of a system for providing maximum-informativeness information extraction (IE) using a domain-specific ontology in accordance with the invention.

Referring to the drawings, wherein like reference numbers correspond to like or similar components throughout the several figures, a system 10 is adapted for executing the method of the present invention via an algorithm 100. The system 10 includes an information extraction module (IEM) 12 adapted for executing the algorithm 100. Execution of algorithm 100 by the IEM 12 provides an optimized information extraction (IE) capability, i.e., a method for generating structured values from unstructured free text as set forth in detail below.

Figure 2:
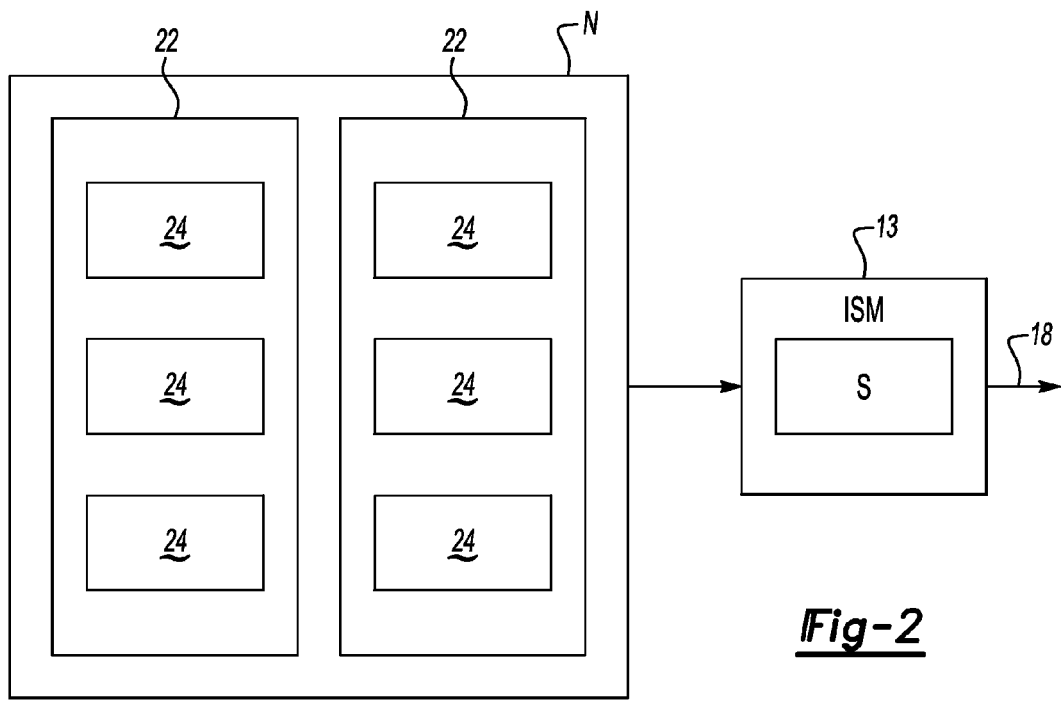
FIG. 2 is a schematic illustration of a domain-specific ontology and an informativeness function of the system shown in FIG. 1.

The IE capability of system 10 is based on a predetermined domain-specific ontology (N) and an informativeness function (S) from an Informativeness Function Module (ISM) 13 (see FIG. 2). As used herein, the term "ontology" refers to a taxonomy of concepts, where each link stands for a relationship, e.g., "is-a", "part-of", or another logical or linguistic relationship. Since the ontology (N) is a taxonomy, it may be referred to by its various levels, ancestors, descendants, etc., using other standard taxonomic terminology, as is understood in the art. The informativeness function is used by the IEM 12 to disambiguate different logical or linguistic matches in the ontology, and may be derived from the ontology in a variety of ways as described below.

Information is stored in a knowledge source, represented in FIG. 1 as a database system (DBS) 15, with the IEM 12 adapted to query (arrow Q) and retrieve (arrow R) information stored within the DBS based on input 14, e.g., a short text-based phrase or a block of text, from a user 11. While shown as a single device for simplicity, the DBS 15 may be a widely-distributed set of databases or other available knowledge sources containing the text-based information that is being queried by the IEM 12.

The DBS 15 may be connected to the IEM 12 and accessed via a wide area network (WAN), a local area network (LAN), over the internet, etc. Information contained in the DBS 15 may be heterogeneous, i.e., may be provided from any number of sources, both largely unknown and potentially unlimited in scope. The data may come from heterogeneous domains, i.e., the data may be provided or obtained from various different manufacturing systems in varying formats, such as from production, quality, error-proofing, electronic pull system, option data delivery, upload/download and compare, routing and tracking systems, and/or maintenance systems.

The IEM 12 may be configured as a digital computer generally comprising a microprocessor or central processing unit, read only memory (ROM), random access memory (RAM), electrically-erasable programmable read only memory (EEPROM), a high-speed clock, analog-to-digital (A/D) and digital-to-analog (D/A) circuitry, and input/output circuitry and devices (I/O), as well as appropriate signal conditioning and buffer circuitry.

Any algorithms resident in the system 10 or accessible thereby, including the algorithm 100 for IE in accordance with the invention as described below, can be stored in ROM and automatically executed to provide the respective functionality. The IEM 12 may be placed in communication with a host machine (HOST) 20 and adapted to output data 18 thereto for subsequent data mining or other data or information processing by the host 20. The host 20 may utilize this data 18 to generate a report 21 for display and/or printed dissemination.

Still referring to FIG. 1, execution of the algorithm 100 classifies the phrases in the input text block 14 from the user 11 using the ontology (N). The informativeness function (S) implemented in ISM 13 quantifies just how well a discovered phrase has been classified by the IEM 12. The number and location of matching nodes in the ontology (N) are factors in any overall quantitative measure of informativeness.

Referring to FIG. 2, each node 22 of the domain-specific ontology (N) contains a list of text phrases, which are represented as the phrases 24. A given node 22 represents a single concept, and all phrases 24 in the node make up a set of synonyms or near synonyms that collectively define the concept. In general, the ontology (N) will define a set of objects of interest for a particular application. For example, each node 22 may define a category of parts in an automotive parts taxonomy, with sample phrases 24 being "fuel injector hose", "fuel injection tube", and "fuel injector fuel feed pipe" in one possible embodiment.

The informativeness function (S) may be applied by the ISM 13 and adapted to automatically normalize, standardize, and/or map sub-phrases of the phrases 24 in the ontology (N) to a number between 0 and 1. More precisely, if (M) is a node 22 in the ontology (N), then (M) contains a list of phrases 24. If (W) is a sub-phrase of a phrase 24, then (W) might be word, a two-word phrase, a three-word phrase, etc. An informativeness function S(W) is defined for any such sub-phrase (W), and is not meaningful otherwise.

Exemplary functions (S) may vary, with four possible functions defined here for the purpose of illustration. If (W) is a phrase, define (N_W) to be the subset of the ontology (N) of all nodes 22 that contain the phrase (W). Thus, the phrase (W) is a sub-phrase of at least one of the synonyms contained in each of the nodes 22 of subset (N_W). The following formulas may be linearly-transformed to range from 0 at their minimum value to 1 at their maximum value: (1) 1/the number of nodes in (N_W), which ranges from 1/number of nodes 22 in the ontology (N) to 1; (2) the maximum level in the ontology (N) of the nodes 22 in subset (N_W), which ranges from 1 to the maximum number of levels in the ontology (N); (3) 1/the number of main branches of the ontology (N) that intersect subset (N_W), which ranges from 1/maximum number of main branches in the ontology (N) to 1; and (4) 1/the number of ancestors in subset (N_W), which ranges from 1/number of nodes of ontology (N) to 1. Here is a further discussion of formula (4): a node 22 is either its own ancestor in subset (N_W) or it has some node above it contained in (N_W). In this embodiment, one may count the number of nodes 22 in the subset (N_W) that have no node above them in (N_W). The set of ancestors in subset (N_W) is a kind of compact representation of (N_W).

Function (3) above, after being linearly transformed to range from 0 at its minimum value to 1 at its maximum value, is given by the formula $S(W)=(MAX\ NUM-NUM)/(MAX\ NUM-1)$, where NUM=the number of main branches of the ontology (N) containing phrases that contain (W) and MAX NUM is the total number of main branches. Note that S(W) maps to 1 if NUM=1 and to 0 is NUM=MAX NUM. As will be understood by those of ordinary skill in the art, functions (1-4) outlined above are examples, with the subjective "best" informativeness function (S) ultimately combining features from several of the functions (1-4) or other functions.

Still referring to FIG. 2, if a phrase (X) is identified as a possible object of interest in the input text block 14, and if the phrase (X) contains the subphrase (W), and if (W) matches a sub-phrase in a synonym 24 in a node 22 in the ontology (N), then the informativeness function S(W) is intended to measure how much is known about the meaning of the phrase (X) from knowing the phrase (W). For example, an informativeness function S(W)=1 means that one can disambiguate the phrase (W), and therefore the phrase (X), as well as is desired. Usually, this may be defined in terms of placing (W) inside sub-trees at a certain level of the ontology (N), e.g., placing a part described by a phrase (X) at a fourth level or lower might classify the part sufficiently well for some applications. The choice of the satisfactory level would depend on the needs of the specific application.

That is, if the phrase (W)=CALIPER, then defining S(W)=1 might be considered to be reasonable, because knowing that the phrase 24 contains the word "CALIPER" would classify the phrase 24 in the category of BRAKES which might be enough for some specific application. In the extreme case that phrase 24 is contained in only one node 22 of the ontology (N), then the function S(W) must equal 1. If S(W)=0, one knows nothing about the meaning of the phrase 24. Often, this case occurs when there are many nodes containing the sub-phrase (W) and they are widely distributed in all locations of the ontology (N).

The informativeness function (S) will usually obey the property: if (W') is a sub-phrase of the phrase (W), then S(W') is less than or equal to S(W), because adding modifiers generally does not make a phrase less informative. However, the result S(W')=S(W) is possible, even if (W') is a proper sub-phrase of (W), because adding a modifier does not always help to disambiguate the phrase.

Figure 3:
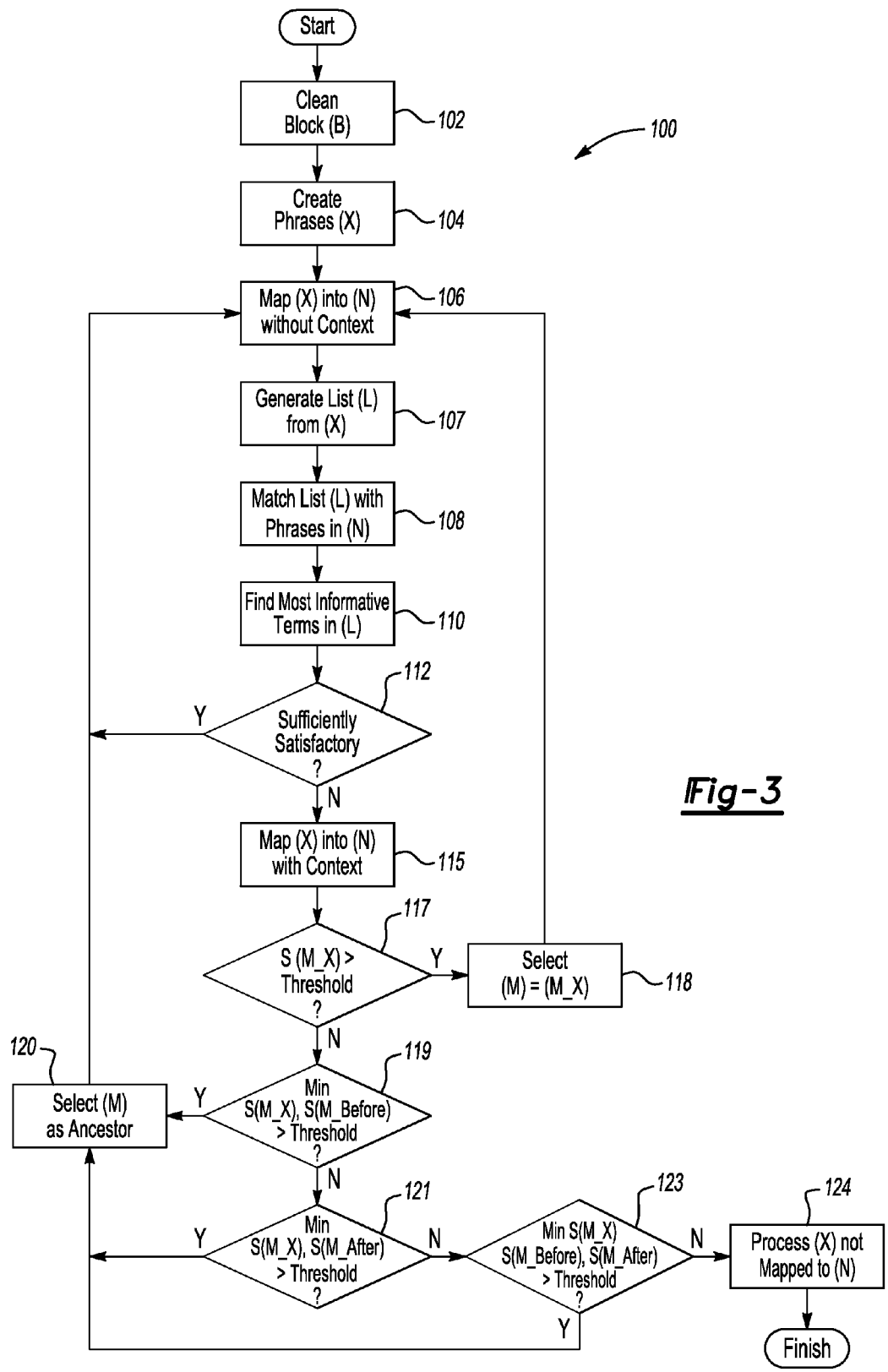
FIG. 3 is a flow chart describing an algorithm for providing maximum-informativeness IE using a domain-specific ontology.

Referring to FIG. 3 in conjunction with FIGS. 1 and 2, the IE process enabled by the system 10 of FIG. 1 is explained in further detail. Given a block of text (B) as the input 14, e.g., a short phrase, a paragraph, or pages, the IEM 12 selects one or more nodes 22 in the domain-specific ontology (N) that represent concepts or objects referenced in the block of text (B).

The algorithm 100 begins with step 102, wherein the block of text (B) is input to the IEM 12 and/or recorded thereby. Once input, the block of text (B) is cleaned. As used herein, to be "cleaned" refers to splitting any joined words (e.g., left-caliper to left caliper), joining of any split words (e.g., assembly to assembly), expanding abbreviations (ASM to assembly), executing a spell check process, removing known stop words or words lacking a domain-specific meaning, stemming of words or phrases using a stemmer program, e.g., a standard natural-language processing (NLP) utility. Once cleaned, the algorithm 100 proceeds step 104.

At step 104, a list of phrases is created in the block of text (B), with each phrase represented as (X) in FIG. 3. The IEM 12 identifies the phrases (X) in the block of text (B) that are candidates to be names of concepts or objects of interest. If the text of the phrases (X) is grammatical in nature, one may be able to run a standard NLP grammar analyzer to help with this process. Ideally, the phrases (X) would unambiguously name a single object of interest in the ontology (N), so that the informativeness function S(X)=1. If the phrase (X) refers to several different objects in the ontology (N), it might be that only one object would be identified by the process, i.e., the object that is the most informatively represented by a sub-phrase of (X).

At step 106, the algorithm 100 begins to map each phrase (X) into the domain-specific ontology (N) without using context. (Step 115, as explained below, describes the alternative procedure to map using context.) At step 107, the algorithm 100 generates a complete list (L) of sub-phrases from the phrase (X), such as single words or multi-word phrases. After completing step 107, the algorithm 100 proceeds to step 108 and matches the list (L) with the phrases in the ontology (N) by finding all nodes of the ontology (N) that have phrases with sub-phrases matching at least one element of the list (L). Step 108 may include dropping from the list (L) any terms that do not match anything in the ontology (N). The algorithm 100 then proceeds to step 110.

At step 110, the most informative terms in the list (L) are found using a predetermined method, such as: eliminating from the list (L) all candidates except those with a maximum informativeness, eliminating from the list (L) all candidates whose informativeness is less than a fixed threshold, e.g., 0.8 in one embodiment, or eliminating from the list (L) all candidate whose informativeness score does not equal that of the n-largest informativeness scores associated with elements of the list (L), where n is a fixed integer, or whose informativeness score is less than a fixed threshold, e.g., 0.5 according to one embodiment. The algorithm 100 identifies the nodes 22 in the ontology (N) that are associated with the most informative elements in the list (L), and proceeds to step 112.

At step 112, the algorithm 100 determines if the results of steps 106-110 are satisfactory. If so, step 106 is repeated for another phrase (X). Otherwise the algorithm 100 proceeds to step 115 with the phrase (X) still needing to be mapped to (N).

At step 115, the algorithm 100 attempts to map the phrase (X) into the ontology (N), this time using context. Letting (X_before) and (X_after) be the phrases immediately before and after phrase (X), respectively. These form a window of sorts around the phrase (X), which may be modified in various ways as needed, e.g. by choosing two phrases before and/or two phrases after or generating other alternatives to the methodology. The algorithm proceeds to step 117.

At step 117, (M_X) is defined to be a node 22 in the ontology (N) that has a sub-phrase matching a sub-phrase in the phrase (X) with the highest informativeness score of all nodes in the ontology (N). If that informativeness score is large enough, i.e., exceeds a threshold of 0.8 in one embodiment, then the IEM 12 selects (M)=(M_X) at step 118 and leaves the loop, i.e., returns to step 106. Otherwise the algorithm 100 proceeds to step 119.

At step 119, the IEM 12 defines (M_X) and (M_before) to be nodes 22 in the ontology (N) which have the characteristics that (1) they have sub-phrases matching sub-phrases in (X) and (X_before), respectively, and (2) they are on the same path from leaf to root in the ontology (N), i.e., one is an ancestor of the other, and (3) the smaller of their two informativeness values is maximal over all such pairs in the ontology (N). If the smaller value is large enough, i.e., greater than a threshold of 0.5 in one embodiment, then the IEM 12 defines (M) to be the ancestor of the two nodes (M_X) and (M_before) at step 120 (where (M) is the node in (N) that (X) is mapped to), and return to step 106. Otherwise, proceed to step 121.

At step 121, the IEM 12 defines (M_X) and (M_after) to be nodes 22 in the ontology (N) which have the characteristics that (1) they have sub-phrases matching sub-phrases in (X) and (X_after), respectively, and (2) they are on the same path from leaf to root in the ontology (N), i.e., one is an ancestor of the other, and (3) the smaller of their two informativeness values is maximal over all such pairs in the ontology (N). If the smaller value is large enough, i.e., greater than a threshold of 0.5 in one embodiment, then the IEM 12 defines (M) to be the ancestor of the two nodes (M_X) and (M_after) at step 120 (where (M) is the node in (N) that (X) is mapped to), and returns to step 106. Otherwise, the algorithm 100 proceeds to step 123.

At step 123, the IEM 12 defines (M_X), (M_before), and (M_after) to be nodes 22 in the ontology (N) which have the characteristics that (1) they have sub-phrases matching sub-phrases in (X), (X_before), and (X_after), respectively, and (2) they are on the same path from leaf to root in the ontology (N), and (3) the smallest of their three informativeness values is maximal over all such triples in the ontology (N). If that smallest value is large enough, i.e., greater than a threshold of 0.5 in one embodiment, the IEM 12 defines (M) to be the one of these three nodes closest to the root of the ontology (N) at step 120 (where (M) is the node in (N) that (X) is mapped to), and proceeds to step 106. Otherwise, the algorithm 100 proceeds to step 124.

At step 124, the algorithm 100 handles (X) that have not been matched to any nodes in the ontology (N). If available, the algorithm 100 may execute a synonym generation process (see FIG. 3 and algorithm 200, as described below) or a context expansion process (see FIG. 5 and algorithm 300, as described below). If (X) has still not been matched to any nodes in (N), algorithm 100 may transmit a message to a person for further evaluation of (X). The algorithm 100 is then finished.

Referring to FIG. 4, another algorithm 200 may be executed by the system 10 of FIG. 1 in conjunction with the algorithm 100 of FIG. 3. As explained above, the IE process set forth in FIG. 2 matches discovered text phrases with text phrases contained in a domain-specific ontology (N). Nodes 22 in the ontology (N) include synonyms. However, sometimes domain-specific knowledge resources such as the DBS 15 of FIG. 1 do not contain a sufficient number of synonyms. General-purpose knowledge resources such as a thesaurus may be consulted, but these may include too many paraphrases, abbreviations, or other extraneous meanings to be directly useful. The potential number of possible synonyms from all sources makes it impracticable to capture all synonyms a priori in any given ontology. Therefore, the system 10 of FIG. 1 may be adapted to automatically expand a list of synonyms using a general thesaurus. Execution of the algorithm 200 by the IEM 12 of FIG. 1 provides such a synonym-generation process usable with the algorithm 100 of FIG. 3.

The algorithm 200 begins at step 202, wherein the IEM 12 determines that a discovered phrase (X) is not matched with sufficient informativeness in the ontology (N). An example of a phrase (X)=GAS CAP LOCK ASSEMBLY will be used throughout the explanation of algorithm 200, although this phrase is merely illustrative. Once identified, the algorithm 200 proceeds to step 204, wherein the algorithm 200 automatically trims away known stop words, i.e., words having a relatively high level of ambiguity, and/or words from the ontology (N) with relatively little informativeness. In the example above, the phrase (X)=GAS CAP LOCK ASSEMBLY may be trimmed to GAS CAP LOCK. Once trimmed, the algorithm 200 proceeds to step 206.

At step 206, remaining words in the phrase (X) are looked up in a general purpose thesaurus such as Wordnet to create variants on the original phrase. For example, synonyms for the term GAS may include GASOLINE, PETROL, NAPALM, GASOHOL, FUEL, HYDROCARBON, etc. Once the IEM 12 has extracted a number of variants, the algorithm 200 proceeds to step 208.

At step 208, for each variant on (X) from step 206, the algorithm 200 finds the sub-phrase (W) matching at least one node 22 in the ontology (N) and maximizes the informativeness function (S) for all choices of the sub-phrases. Step 208 is analogous to the algorithm 100 set forth above with reference to FIG. 2. For example, generated variants of GAS CAP LOCK may include FUEL CAP LOCK, a term which for the purposes of illustration might be included in the ontology (N). If there is no match for any sub-phrase, the algorithm 200 discards this variant and proceeds to the next variant. The variant that yields the largest informativeness score may be considered to be the next synonym for the phrase (X). For example, generated variants of GAS CAP LOCK may include FUEL CAP LOCK. The algorithm 200 then proceeds to step 210, where the synonym list may be optionally expanded in the ontology (N) using the new variants and the trimmed phrase (X). This ends the description of algorithm 200.

Sometimes, it may be difficult to directly classify a particular phrase (X) from a block of free text (B) using the domain-specific ontology (N). Context expansion refers to the use of an un-annotated domain-specific text archive to re-contextualize the phrase (X) in a new block of text, (B'). Phrases near (X) can be classified, with these classifications used to infer a classification of phrase (X). The domain-specific archive is un-annotated, as annotation is generally considered to be an expensive, time consuming process, and is therefore generally not available for domain-specific text. Examples of such text include service manuals and parts description manuals for automotive repair texts.

Referring to FIG. 5, another algorithm 300 is therefore provided that is executable by the system 10 of FIG. 1 in conjunction with algorithm 100 to provide such context expansion. At step 302, which is analogous to step 202 described above, the algorithm 300 determines that a discovered phrase (X) is not matched with sufficient informativeness in the domain-specific ontology (N), e.g., (X)=LEFT HATCH ASSEMBLY. Once identified, the algorithm 300 proceeds to step 304, which much like step 204 above trims away known stop words, and/or words from the ontology (N) with little informativeness. In the example above, the phrase (X)=LEFT HATCH ASSEMBLY may be trimmed to (X)=HATCH.

At step 306, the algorithm 300 finds occurrences of phrase (X) in a domain-specific text archive, e.g., a service parts catalog, and then proceeds to step 308. Note that execution of step 308 is analogous to algorithm 100 set forth above with reference to FIG. 3. At step 308, the algorithm 300 classifies phrases near (X) in a new text block (B'). Staying with the same example, a number of hits may classify HATCH under BODY CLOSURES: REAR CLOSURE: DECKLID. This ends the description of algorithm 300.

As noted above, a domain-specific ontology is a taxonomy of linked concepts that are all contained in a limited domain, where each link stands for a relationship. For example, the concepts may be automotive parts categories. Each node in the ontology contains a phrase describing its concept or a list of such phrases, i.e., synonyms. The most straightforward way to "clean up" an ontology is by way of expert human review. The present invention therefore also seeks to reduce the labor required for such a clean-up process.

In particular, when different ontologies are cobbled together from corporate knowledge sources that are created for other uses, the following flaws may occur: (1) different node names are created that are essentially synonyms of each other, e.g., the terms ADAPTER and ADAPTOR; (2) nodes that are logically closely related are not closely related in the taxonomy, e.g., OIL PAN and OIL PAN ASSEMBLY may share a common ancestor, but this ancestor may be located multiple levels above the node; (3) node A is logically a child of node B, but is attached to an ancestor of node B; and (4) functional and physical classifications are mixed between node names, thereby creating redundancies, e.g., LUBRICATION & VENTILATION may be a parent of a node LUBRICATION, but a node ENGINE THERMAL MANAGEMENT may be parent of an entirely different node LUBRICATION. The system 10 therefore may be adapted to compare every node name to every other node name, e.g., using the algorithm 100 as set forth above, and further adapted to consider similarities to determine if there are any implied inconsistencies.

Referring to FIG. 6, an algorithm 400 is provided that is executable by the system 10 of FIG. 1 in conjunction with algorithm 100. Algorithm 400 begins at step 402, wherein a node (M) is selected for analysis, e.g., a phrase discovered in a block of text. Once chosen, the algorithm 400 proceeds to step 404, where the name of the node selected at step 402 is compared to all other node names in the domain-specific ontology (N) to look for matches with maximum informativeness. For example, if phrase (X) is a sub-phrase of a node 22 having a node name (Y), this suggests that node name (Y) should be a descendant of phrase (X). A more general search process would consider all sub-phrases of (X) to compare to all of the matching sub-phrases in the ontology (N). At step 406, the matching sub-phrases are automatically evaluated to determine if they are sufficiently informative. If so, at step 408 the results are compiled for human review, otherwise algorithm 400 exits.

Step 408 may be facilitated as follows: (1) nodes whose names are identical or synonyms of each other may be marked. These nodes could be consolidated. However, if the nodes result from two different knowledge models, e.g., functional and physical models, a decision should be made as to how these models might be reconciled; (2) nodes whose names suggest they are related as ancestors or descendants, e.g., because they contain informative sub-phrases of each other, can be organized in an output report to bring out these potential relationships, and to facilitate further review. Available synonym, hypernym, and/or hyponym lists might also be exploited to find logical siblings, parents, and children; (3) although the methodology set forth hereinabove is a general tool for all ontologies, special issues may emerge when particular ontologies are analyzed. These may suggest patterns that can be systematically detected within step 408. This ends the description of algorithm 400.

While the best modes for carrying out the invention have been described in detail, those familiar with the art to which this invention relates will recognize various alternative designs and embodiments for practicing the invention within the scope of the appended claims.

The invention claimed is:

1. A method for transforming unstructured text into structured data using a domain-specific ontology, the method comprising:
   recording the unstructured text using an information extraction module (IEM);
   discovering text phrases contained in the recorded unstructured text via the IEM;
   retrieving lexical data from a knowledge source using the IEM and the discovered text phrases;
   processing each of the discovered text phrases and the lexical data using the IEM to thereby generate a plurality of nodes in the domain-specific ontology, wherein each of the plurality of nodes represents a corresponding single concept as a cluster of synonyms;
   using the plurality of generated nodes to classify the discovered text phrases by corresponding objects of interest, thereby transforming the unstructured text into structured data;
   generating a list of sub-phrases of the discovered text phrases;
   mapping each sub-phrase in the generated list of sub-phrases into the domain-specific ontology via the IEM;
   using an informativeness function to quantify each of the sub-phrases of the discovered text phrases by a normalized relative importance informativeness score of between 0 and 1; and
   eliminating all sub-phrases from the domain-specific ontology that have an informativeness score that is less than a calibrated threshold.

2. The method of claim 1, further comprising:
using the informativeness function to disambiguate different matches in the domain-specific ontology.

3. The method of claim 1, further comprising:
automatically expanding a list of the synonyms in the cluster of synonyms using a thesaurus.

4. The method of claim 1, further comprising:
using an un-annotated domain-specific text archive to process the unstructured text into a new block of text;
automatically classifying phrases near the unstructured text; and
using the classified phrases to infer a classification of the unstructured text.

5. The method of claim 1, further comprising:
comparing a name of each node in the domain-specific ontology with all other nodes in the domain-specific ontology to thereby identify logical inconsistencies and linguistic inconsistencies.

6. The method of claim 1, further comprising:
automatically cleaning the unstructured text by at least one of: splitting joined words in the unstructured text, joining split words in the unstructured text, expanding an abbreviation in the unstructured text, executing a spell check process on the unstructured text, removing from the unstructured text any words lacking a domain-specific meaning, and stemming words or phrases in the unstructured text using a stemmer program.

7. A method for transforming unstructured text into structured data using a domain-specific ontology, the method comprising:
   inputting the unstructured text into an information extraction module (IEM);
   embedding the unstructured text in a domain-specific text archive;
   retrieving data from a plurality of different knowledge sources, including the domain-specific text archive, via the IEM using the unstructured text;
   processing the unstructured text using the IEM based on the retrieved data to thereby generate a plurality of nodes in the domain-specific ontology, wherein each of the nodes represents a corresponding single concept as a cluster of synonyms for the unstructured text;
   transforming the unstructured text into the structured data via the plurality of nodes, including classifying the unstructured text to predetermined corresponding objects of interest;
   quantifying all sub-phrases of the classified unstructured text by relative informativeness as a normalized value between 0 and 1 using an informativeness function; and
   eliminating all quantified sub-phrases from the domain-specific ontology having a normalized value that is less than a calibrated threshold.

8. The method of claim 7, further comprising:
using the informativeness function to disambiguate different matches in the domain-specific ontology.

9. The method of claim 7, further comprising:
automatically expanding the list of synonyms in the cluster of synonyms using the IEM and a thesaurus.

10. The method of claim 7, further comprising:
automatically classifying phrases near the unstructured text; and
using the classified phrases to infer a classification of the unstructured text.

11. The method of claim 7, further comprising:
comparing a name of each node in the domain-specific ontology with all other nodes in the domain-specific ontology to thereby identify logical inconsistencies and linguistic inconsistencies.

12. An information extraction module (IEM) comprising:
a computer device; and
an algorithm recorded in memory of the computer device and executable by the computer device, wherein the computer device executes the algorithm to thereby:
receive and record an input block of unstructured text;
discover text phrases contained in the received input block of unstructured text;
access and retrieve lexical data from a knowledge source using the discovered text phrases;
process the discovered text phrases and the retrieved lexical data to thereby generate a plurality of nodes in the domain-specific ontology;
map sub-phrases of the discovered text phrases into the domain-specific ontology;
use an informativeness function to quantify the sub-phrases by their relative informativeness as a normalized value between 0 and 1; and
eliminate all quantified sub-phrases from the domain-specific ontology having a normalized value that is less than a calibrated threshold;
wherein each of the plurality of nodes classifies the unstructured text to predetermined corresponding objects of interest, thereby transforming the unstructured text into the structured data.

13. The IEM of claim 12, wherein the IEM uses the informativeness function to disambiguate different matches in the domain-specific ontology.

14. The IEM of claim 12, wherein the IEM automatically expands a list of synonyms using a general thesaurus.

15. The IEM of claim 12, wherein the IEM automatically classifies phrases near the unstructured text, and uses the classified phrases to infer a classification of the unstructured text.

16. The IEM of claim 12, wherein the IEM compares a name of each node in the domain-specific ontology with all other nodes in the domain-specific ontology to thereby identify logical inconsistencies and linguistic inconsistencies.

* * * * *